United States Patent
Pandey

(10) Patent No.: US 10,803,054 B2
(45) Date of Patent: Oct. 13, 2020

(54) DYNAMICALLY BUILDING A DATABASE QUERY BY COMBINING A STATIC QUERY CLAUSE WITH A USER-SPECIFIED FILTER

(71) Applicant: Oracle International Corporation, Redwood Shores, CA (US)

(72) Inventor: Pradip Kumar Pandey, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 769 days.

(21) Appl. No.: 14/171,474

(22) Filed: Feb. 3, 2014

(65) Prior Publication Data
US 2015/0220656 A1   Aug. 6, 2015

(51) Int. Cl.
G06F 16/242   (2019.01)

(52) U.S. Cl.
CPC .................. *G06F 16/2423* (2019.01)

(58) Field of Classification Search
None
See application file for complete search history.

(56) References Cited

U.S. PATENT DOCUMENTS

| | | | |
|---|---|---|---|
| 6,285,998 B1 * | 9/2001 | Black | G06F 17/30392 |
| 8,065,219 B2 | 11/2011 | Haynie et al. | |
| 8,131,743 B1 * | 3/2012 | Joyce | G06F 17/30436 |
| | | | 707/759 |
| 8,370,281 B2 | 2/2013 | Heuler et al. | |
| 2003/0041147 A1 | 2/2003 | van den Oord et al. | |
| 2004/0068489 A1 * | 4/2004 | Dettinger | G06F 17/30595 |
| 2005/0091199 A1 * | 4/2005 | Focazio | G06F 17/30595 |
| 2005/0102284 A1 * | 5/2005 | Srinivasan | G06F 17/30398 |
| 2011/0208337 A1 | 8/2011 | Norman et al. | |
| 2015/0169685 A1 * | 6/2015 | Elias | H04L 47/125 |
| | | | 707/718 |

FOREIGN PATENT DOCUMENTS

| | | |
|---|---|---|
| EP | 1523152 A2 | 4/2005 |
| EP | 2293190 A2 | 3/2011 |
| WO | 2001013303 A1 | 2/2001 |

OTHER PUBLICATIONS

Code Effects, "Filtering LINQ Queries Using Business Rules Engine", Code Project, Nov. 19, 2012, 7 pages.

(Continued)

*Primary Examiner* — Giuseppi Giuliani
(74) *Attorney, Agent, or Firm* — Vista IP Law Group, LLP

(57) ABSTRACT

A method, system, and computer program product for dynamically building a database query by combining a static query clause with a user-specified filter. A method commences upon receiving a user-specified query filter from a user interface, then reformatting the user-specified query filter from a first query filter representation (e.g., clicks or text from the user interface) into a second query filter representation (e.g., into XML or into a database connectivity format, or into an SQL format, or into any native format). Subsequent steps combine the second query filter representation with a predefined database query (e.g., from an enterprise application) to form a dynamically-generated database language query. The filter is specified at a user interface, and the predefined database query is specified by an application.

20 Claims, 13 Drawing Sheets

(56) References Cited

OTHER PUBLICATIONS

Business Objects, "Doing More with Business Objects" iS information Services, 2010, 97 pages.
Oracle, "Introduction to WebLogic Server and Weblogic Express" Dec. 2, 2011, 13 pages.
"Oracle Fusion Middleware", Metadata Repository Builder's Guide for Oracle Business Intelligence Enterprise Edition, 11g Release, Jul. 2010, 566 pages.
"Queries: Retrieving Information from a Data Source", Oct. 20, 2012, 4 pages.
"SAP Mobile Infrastructure", Mar. 16, 2011, 2 pages.
Man Xiong, et al., "Scaling Out SQL Server with Data Dependent Routing", Jul. 29, 2005, 18 pages.
Ken North, "SOA, Muti-Tier Architectures and Logic in the Database", SQL Summit, Nov. 20, 2011, 8 pages.

* cited by examiner

```xml
<?xml version="1.0" encoding="utf-8"?>
<DATA_SELECTION>
<TABLE_NAME VALUE="V0101E"/>
<TABLE_TYPE VALUE="OWVIEW"/>
<CLAUSE TYPE="WHERE">
   <PARENS TYPE="OPEN" COUNT="1"/>
   <COLUMN NAME="AT1" TABLE="F0101" INSTANCE="0" ALIAS="AT1"/>
   <OPERATOR TYPE="EQ"/>
   <OPERAND>
      <LITERAL VALUE="E"/>
   </OPERAND>
</CLAUSE>
<CLAUSE TYPE="AND">
   <PARENS TYPE="OPEN" COUNT="1"/>
   <COLUMN NAME="ALPH" TABLE="F0101" INSTANCE="0" ALIAS="ALPH"/>
   <OPERATOR TYPE="LK"/>
   <OPERAND>
      <LITERAL VALUE="M%"/>
   </OPERAND>
</CLAUSE>
<CLAUSE TYPE="AND">
   <PARENS TYPE="CLOSE" COUNT="2"/>
   <COLUMN NAME="TAX" TABLE="F0101" INSTANCE="0" ALIAS="TAX"/>
   <OPERATOR TYPE="BW"/>
   <OPERAND>
      <RANGE>
         <LITERAL_FROM VALUE="66"/>
         <LITERAL_TO VALUE="111111"/>
      </RANGE>
   </OPERAND>
</CLAUSE>
</DATA_SELECTION>
```

FIG. 3B

DYNAMICALLY BUILDING A DATABASE QUERY BY COMBINING A STATIC QUERY CLAUSE WITH A USER-SPECIFIED FILTER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database-oriented enterprise applications and more particularly to techniques for building a database query by combining a preformed query with a dynamically-specified filter.

BACKGROUND

Modern business systems are often built in accordance with a multi-tier architecture. In such a multi-tier architecture, software components are assigned into one or another tier on the basis of aspects the component's function. For example, in a three-tier architecture:

The client tier contains programs for interaction directly with users. Such programs include form processors and HTML browsers (see further discussion, below).

The middle tier contains web server(s), authentication servers, and other servers that are addressed directly by operations in the client tier.

The backend tier contains business logic (e.g., enterprise applications) and database systems.

While this multi-tier architecture is broadly adopted, and generally serves the intended purposes, there are undesirable side effects.

One such undesirable side effect arises from the assignment of database services to the backend tier. Execution of database queries is the province of the backend tier (e.g., within a database engine). In this architecture, business logic (also found in the backend tier) forms a query in a database query language and passes the query to a database engine for execution (e.g., in order to receive a result set). This partitioning causes undesirable side effects, at least in that query specification and execution are one or two tiers removed from the user, thus the user is far removed from the actual working of a business logic query.

Some legacy approaches have attempted to ameliorate the aforementioned undesirable effects of a multi-tier architecture by allowing a user to specify the value of a search term (e.g., in a client tier), which search term is passed to a process in another tier, which in turn updates a predefined database query with the value of a search term. Yet, this legacy technique is still deficient in that the designer of the predefined database query must correctly predict the form of the predicate (e.g., columns, values, operations) that might be requested by a user. A user interface that merely allows for specification of values used in a predicate fails to address the deficiencies of such legacy approaches.

What would be needed is a way for a user, running a user interface in a first tier, to specify an entire filter clause (e.g., an entire WHERE clause) to be added to a predefined query that is executed in a backend tier. However, human interface designers often want to insulate users from the specifics of how to form a filter or portion of a query in a database query language format. Accordingly, what is needed is a technique whereby a user can specify a filter or portion of a query using an interactive screen device (e.g., GUI widgets, menus, checkboxes, radio buttons, etc.), and then a middleware component inserts or combines an entire user-specified filter (not merely values) into a pre-formed or partially preformed query in the backend (e.g., a business logic query).

What is needed is a technique or techniques to allow a business application user to interact with upstream tiers (e.g., a client tier in an HTML- and/or forms-based environment) in order to receive at least some aspects of a database query, even though the user need not specify the filter in a database query language format. What is needed is a technique for dynamically building a database query by combining static portions of a predefined query (e.g., within business logic operating in a backend tier) with a complete user-specified query filter.

None of the aforementioned legacy approaches achieve the capabilities of the herein-disclosed techniques for building a database query by combining a preformed query with a dynamically-specified filter. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for building a database query by combining a preformed query with a dynamically-specified filter.

A computer implemented method commences upon receiving a user-specified query clause from a user interface operating in a first tier, then combining, in a second tier, the user-specified query clause with a predefined database query to form a dynamically generated database language query. The predefined database query originates from business logic (e.g., in an enterprise application). The method proceeds by delivering the dynamically-generated database language query to a third tier (e.g., to business logic within an enterprise application).

In one aspect, the method form commences upon receiving a user-specified query filter from a user interface (e.g., using interactive screen devices such as GUI widgets, menus, checkboxes, radio buttons, etc.) without requiring the user to input SQL or any other database query language, and then reformatting the user-specified query filter from such a first query filter representation (e.g., clicks or text from the user interface) into a second query filter representation (e.g., into XML or into a database connectivity format, or into an SQL format, or into any native format). Subsequent steps combine the second query filter representation with a predefined database query (e.g., from an enterprise application) to form a dynamically-generated database language query. The filter is specified at a user interface, and the predefined database query is specified by an application.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3B is an XML representation of a query filter as used in systems for building a database query by combining a preformed query with a dynamically-specified filter, according to some embodiments.

DETAILED DESCRIPTION

Overview

Figure 1A:
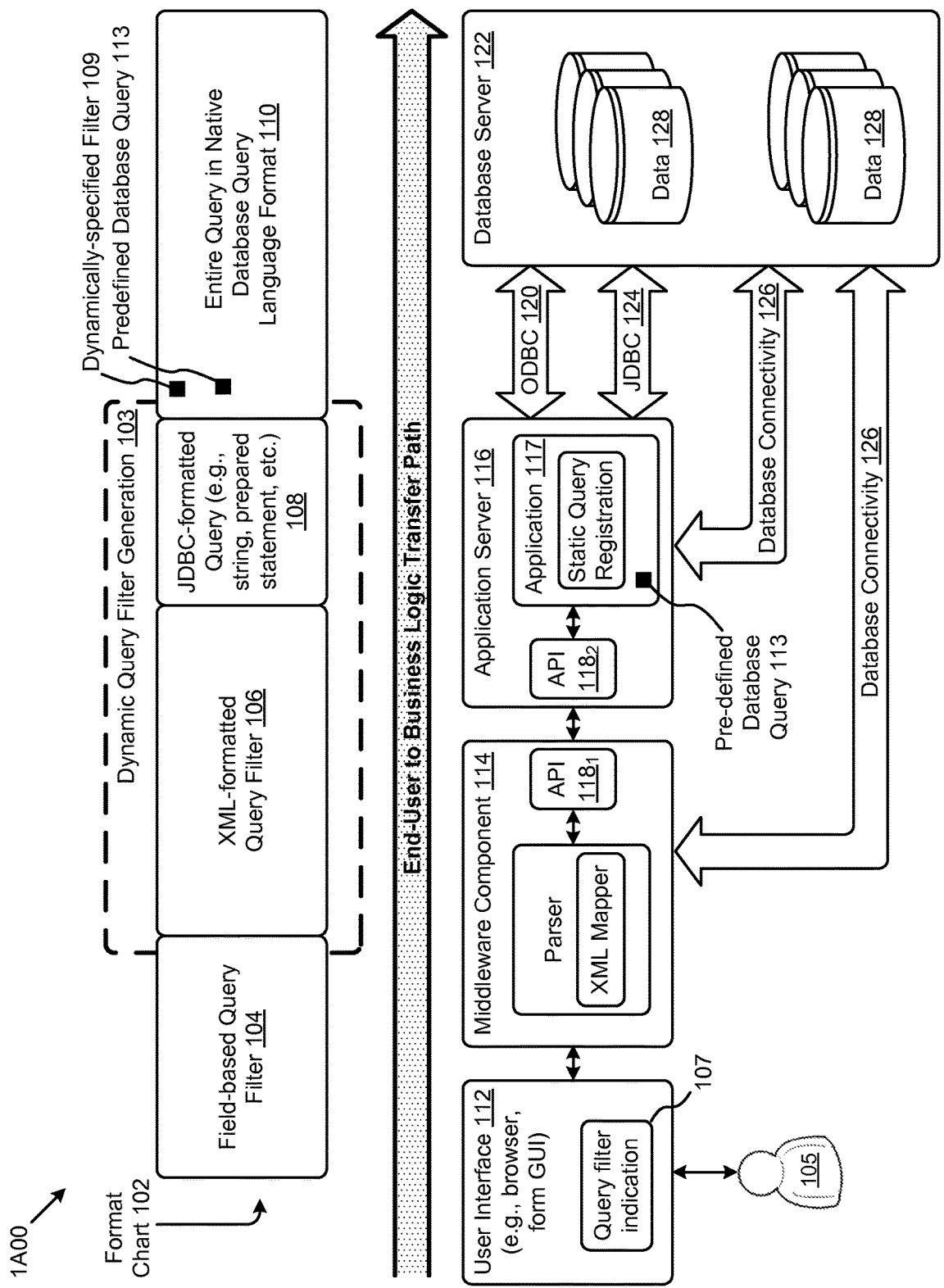
FIG. 1A depicts an environment for building a database query by combining a preformed query with a dynamically-specified filter, according to some embodiments.

Modern business systems are often built in accordance with a multi-tier architecture. In such a multi-tier architecture, software components are assigned into one or another tier on the basis of aspects of the component's function. For example, in a three-tier architecture:

The client tier contains programs for interaction directly with users. Such programs include form processors and HTML browsers (see further discussion, below).

The middle tier contains web server(s), authentication servers, and other servers that are addressed directly by clients.

The backend tier contains business logic and database systems.

While this multi-tier architecture is broadly adopted, and generally serves the intended purposes, there are undesirable side effects.

One such undesirable side effect arises from the assignment of business logic and database services to the backend tier. Execution of database queries is often the province of the backend tier (e.g., within a database engine). Enterprise applications and constituent business logic (also found in the backend tier) form queries in a database query language and passes the queries to a database engine for execution (e.g., in order to receive results). This situation, namely where query specification and query execution are one or two tiers removed from the user, has the aforementioned undesirable side effects.

A forms-based user interface implemented in the client tier serves the purpose of shielding a business application user from the details of a database query language. Yet, shielding a business application user from the details of a database query language has the undesirable effect of preventing a user from forming a query or even parts of a query (e.g., a filter, or a WHERE clause) that can be dynamically added (e.g., appended) to any one or more predefined queries that are used by the business logic (e.g., by the enterprise application, or by the database engine).

Herein disclosed are techniques that allow an end user to specify a query clause while using an interactive application. Such a query clause (e.g., a query filter) can be transferred from an interactive application in a client tier to business logic in a backend tier so that the business logic can execute a database query using the end user-provided criteria.

To illustrate, although it is convenient to implement an application in a middle tier or backend tier (e.g., in an application server or in a database server), it may not be convenient to predetermine every possible query filter that a user might conceive. For example, in a database-oriented application to (for example) query a database and return only automobiles of model year 2000 or later, a user might wish to filter further based on color (e.g., WHERE color=red). Observing that the color of automobiles change over time, and observing that a manufacturer introduces new names for colors at will, it might not be convenient to change the business logic as frequently as colors change. However, if a user interface were able to accept a user-specified query filter, and some techniques were defined to combine the user-specified query filter with the business logic query, then new colors and/or names for new colors could be specified at will by a user without having to change the business logic (e.g., enterprise applications) or other backend processes (e.g., the database engine).

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts an environment 1A00 for building a database query by combining a preformed query with a dynamically-specified filter. As an option, one or more instances of environment 1A00 or any aspect thereof may be implemented in the context of the architecture and functionality of the embodiments described herein. Also, the environment 1A00 or any aspect thereof may be implemented in any desired environment.

Shown in the lower portion of FIG. 1A is a multi-tier environment. A user interface 112 implements a client tier (e.g., using a browser or a form-based GUI). A user 105 interacts with the user interface 112, which is served by middleware component 114. At least some portion of the interaction at user interface 112 corresponds with forms, and/or fields, and/or query filters to be used by application 117. The application 117 can be implemented in an application server 116, as shown, and the application avails itself of the services of data 128 stored at, in, or accessible to database server 122. Access to data 128 via the database server can be implemented using any form of database connectivity 126 (e.g., JDBC connection 124, ODBC connection 120, etc.). A JDBC connection can comprise standards-based Java database connectivity and/or using a proprietary database connectivity technique, and/or any forms of commercially-available database connectivity (e.g., for JD Edwards' database). An ODBC connection can comprise ODBC (e.g., for a SQL server), OCI (e.g., for Oracle), or XDA (e.g., for DB2), or any other known database connectivity protocols.

Figure 2:
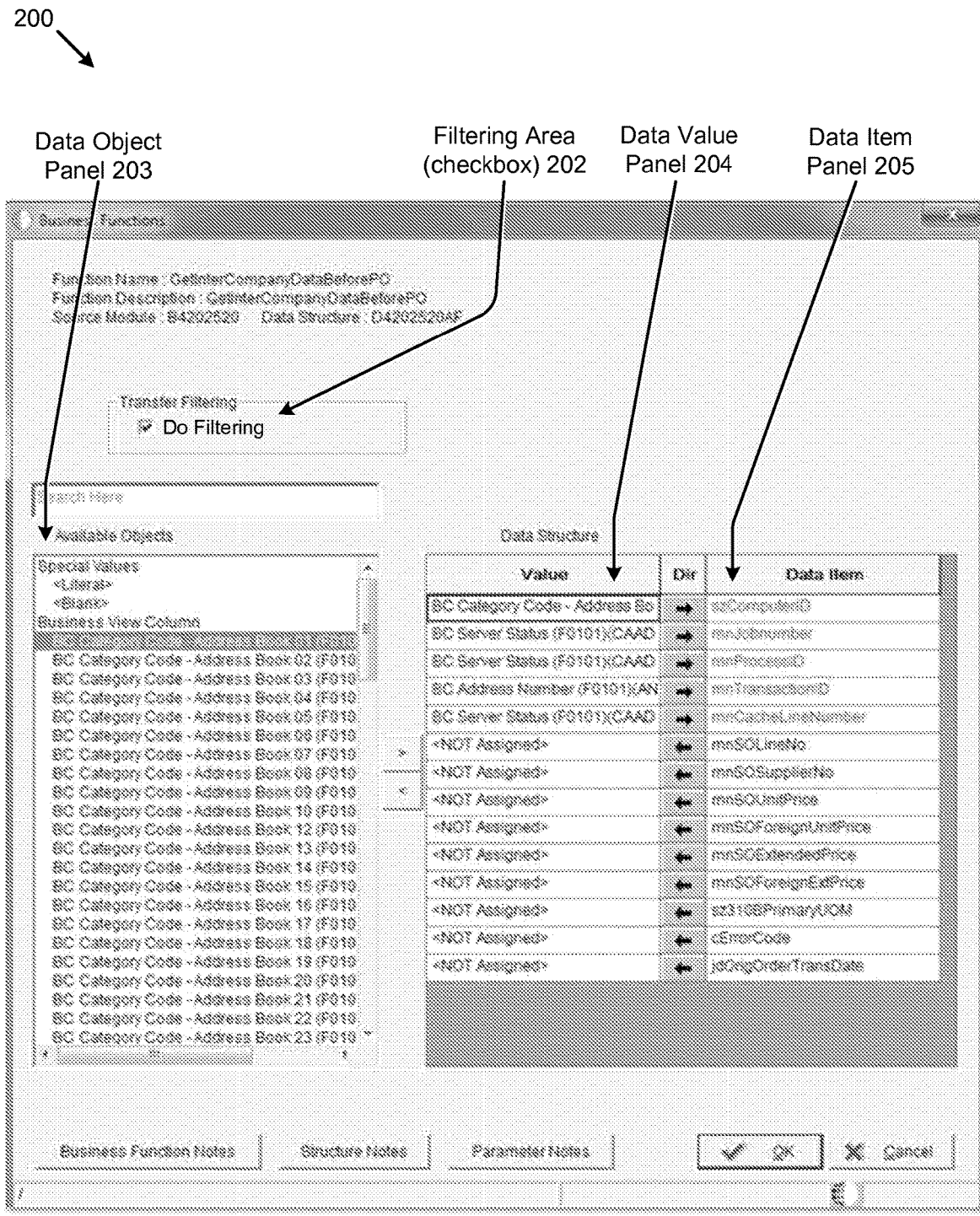
FIG. 2 depicts a user interface screen as used in systems for building a database query by combining a preformed query with a dynamically-specified filter, according to some embodiments.

As shown in the format chart 102, a query filter might be formatted or abstracted as a field-based query filter 104 expressed as form fields (see example in FIG. 2). Also, and as shown on the right portions of the format chart 102, a query filter is expressed as a native database query language clause (e.g., a native WHERE clause). Intermediate abstractions are shown of the format chart 102 in the region labeled as dynamic query filter generation 103. The dynamic query filter generation operations span operations by and between the middleware component and the application server 116. In the embodiment of FIG. 1A, the dynamic query filter generation 103 includes an XML-formatted query filter 106 and a JDBC-formatted query 108. When a query is presented to a database server via a JDBC connection, the JDBC-formatted query 108 can be processed by the database server (e.g., in a native database query language format 110), and results of processing the query can be returned to the application server, and then onward to the middleware component, and then onward again to the user interface 112 for presentation to the user.

A field (e.g., a field within user interface 112) can be registered with a middleware component as a query filter field and, based on the registration, a middleware component can process the query filter field using an application programming interface (API). As shown, a middleware component can process the query filter field over API interface connection $118_1$, which in turn connects to API interface connection $118_2$ within the application server. During the processing between the user's interaction with the registered form field (e.g., in user interface 112) and the processing of a native database query (e.g., in the database server 122) the query filter undergoes transitions through other formats and/or abstractions. In the shown embodiment, the field-based query filter 104 transitions through an XML-formatted query filter 106 and a JDBC-formatted query 108, and then becomes a query comprising a dynamically-specified query filter 109 that is combined with a predefined database query 113 and formed into a native database query language format.

In one use model involving transitions from a user-specified query filter (e.g., the field-based query filter 104) and a native database query, the following steps are taken:

- A business application developer marks a business function as "enabled" or "authorized" to transfer the interactive application query filter (e.g., possibly using a form field and a field-based query filter representation).
- A user interacting with a browser, or interacting with a forms-based interface in the client tier, forms a query filter.
- A web server or other middleware component formats the query filter (e.g., into XML) and transfers the formatted query filter to a business application.
  - In some cases, the XML-based filter criteria uses Unicode encoding which allows passing query filter criteria in multiple languages.
  - In some cases, the XML-based filter criteria supports all SQL filter operators such as "Equal", "Not Equal", "Greater Than", "Less Than", "Between", "IN", "Like", and other known-in-the-art operators.
- An agent in the backend tier (e.g., in a business application) receives the query filter via the API and builds a dynamically-constructed database query using the query filter (e.g., by parsing the query filter into a WHERE clause, and appending the WHERE clause to a preformed query). The agent in the backend tier packages the dynamically-constructed database query to be passed to a database server via a database connectivity technology (e.g., ODBC, OCI and QXDA for a SQL server, Oracle and DB2, etc.).
- An agent in the backend tier (e.g., a database server) executes the dynamically-constructed query and returns a result set to the caller.
- The result set already has the user query filter applied since the query as executed contained the dynamically-created query filter (e.g., a WHERE clause based on the query filter).

The foregoing use case is merely one example, and other use cases are possible.

Figure 1B:
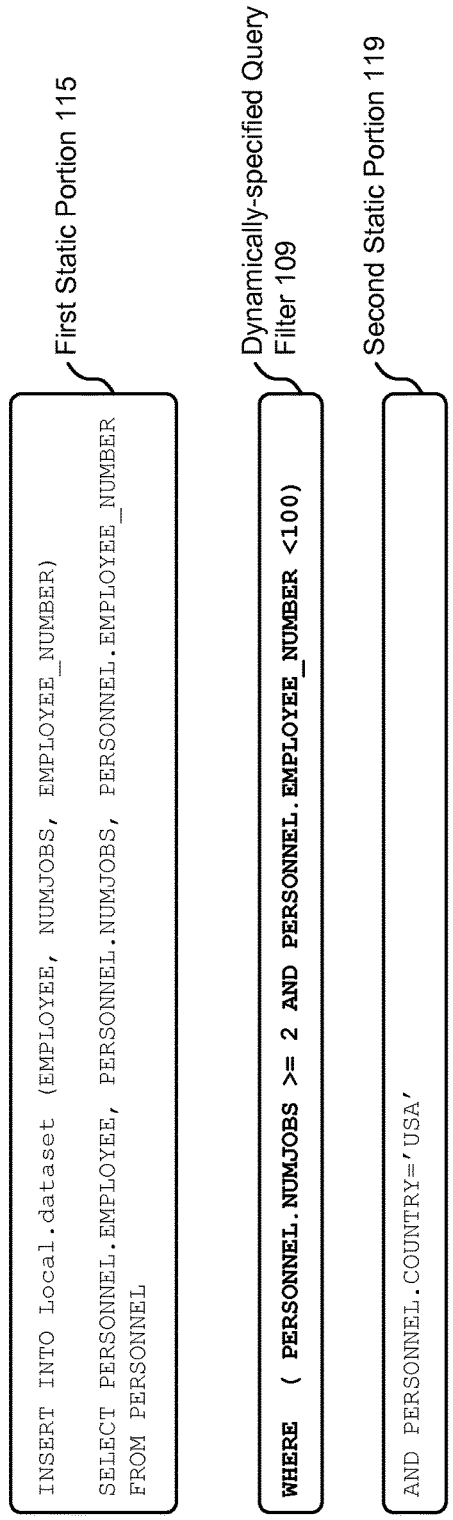
FIG. 1B is an example of a dynamically-generated database language query as used in systems for building a database query by combining a preformed query with a dynamically-specified filter, according to some embodiments.

FIG. 1B is an example of a dynamically-generated database language query 1B00 as used in a system for building a database query by combining a preformed query with a dynamically-specified filter. As an option, one or more instances of dynamically-generated database language query 1B00 or any aspect thereof may be implemented in the context of the architecture and functionality of the embodiments described herein. Also, the dynamically-generated database language query 1B00 or any aspect thereof may be implemented in any desired environment.

Strictly as an example, suppose a personnel administrator wants to prepare a report of all US-based employees who are qualified for more than one job function and were one of the first hundred employees. Further suppose that there exists a user interface (e.g., a browser interface) for a back-end application that is configured to return a table of US employees by employee name, their respective number of job functions, and their respective employee number. To accomplish this, using a dynamically-specified filter, the personnel administrator (e.g., user 105) interacts with the user interface. The interaction results in a user-specified query filter which is sent to a middleware component for reformatting into a native database query that contains the dynamically-specified filter.

Referring again to dynamically-generated database language query 1B00, the query initially comprises a first static portion 115 and a second static portion 119, to which first and second static portions are added the dynamically-specified filter.

As shown, the first static portion codifies the semantics to add to a data set (see INSERT INTO Local.dataset) the employee's name (see EMPLOYEE), the number of jobs that the employee is qualified to perform (see NUMJOBS), and the employee's employee identification number (see EMPLOYEE_NUMBER). The second static portion codifies the semantics to limit to considering only US-based employees (see PERSONNEL.COUINTRY='USA'). Also shown between the first static portion and the second static portion is a dynamically-specified filter 109. The dynamically-specified filter follows the syntax of a fully-formed WHERE clause.

When the aforementioned back-end application processes the administrator's request, the WHERE clause will be included in the query, and the results of the query will contain results filtered in accordance with the administrator's request. In this example, the administrator's intent was to generate a report of all USA-based employees (e.g., as is included in the second static portion 119), but filtered to contain only employees who are qualified for more than one job function (e.g., as is included in the term PERSONNEL.NUMJOBS >=2), and who were among one of the first hundred employees (e.g., as is included in the term PERSONNEL.EMPLOYEE_NUMBER <100).

Figure 1C:
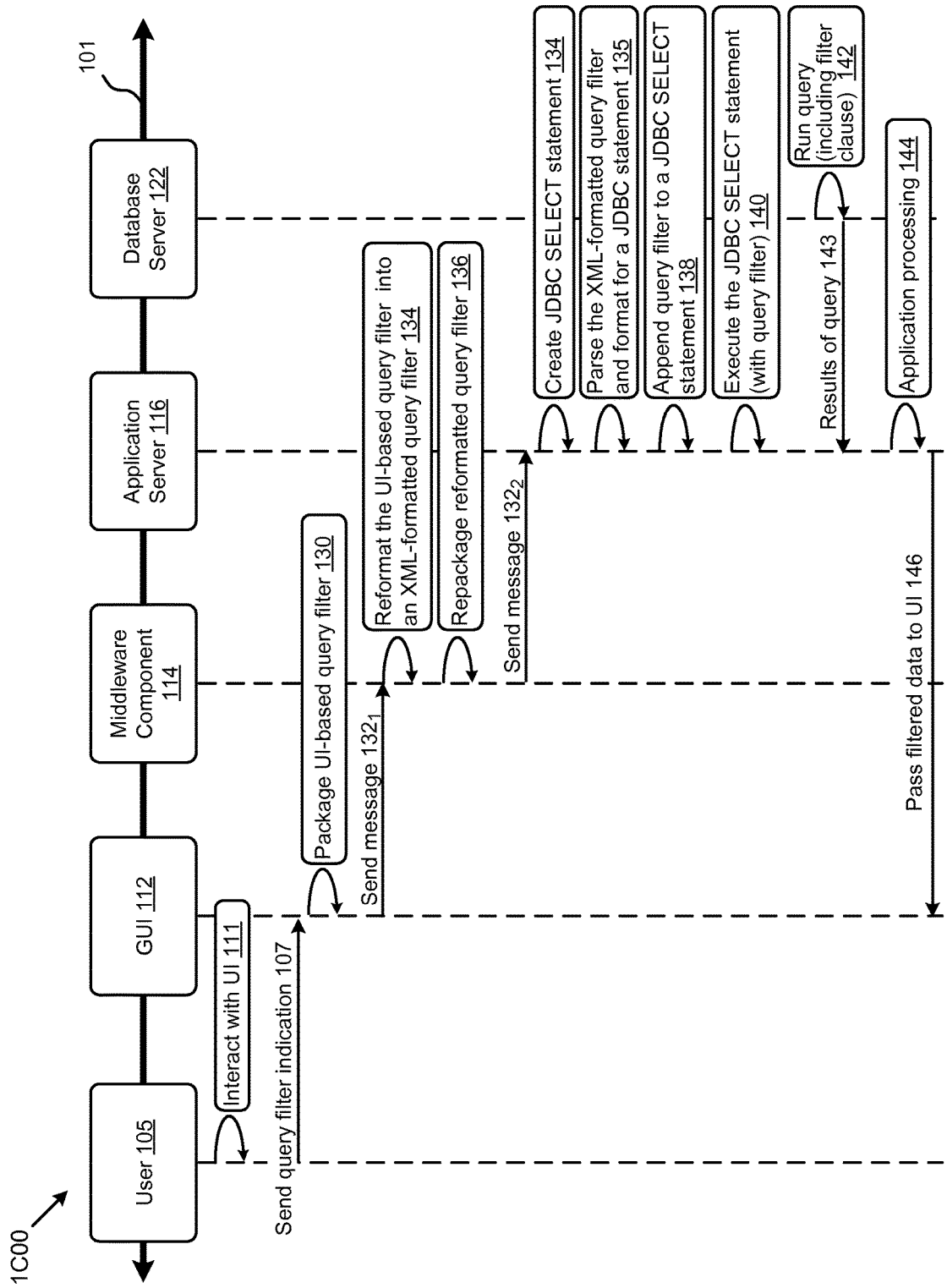
FIG. 1C depicts a protocol carried out between operational elements for building a database query by combining a preformed query with a dynamically-specified filter, according to some embodiments.

A multi-tier system and an exemplary protocol for combining a preformed query with a dynamically-specified filter are shown and discussed as pertaining to FIG. 1C.

FIG. 1C depicts a protocol 1C00 carried out between operational elements for building a database query by combining a preformed query with a dynamically-specified filter. As an option, one or more instances of protocol 1C00 or any aspect thereof may be implemented in the context of the architecture and functionality of the embodiments described herein. Also, the protocol 1C00 or any aspect thereof may be implemented in any desired environment.

The shown protocol over path 101 involves transmissions and transitions of a user-specified query filter to a native database query as follows:

A user 105 interacts with a browser or other user interface 112 that is running in the client tier (see operation 111).

The interaction results in a query filter indication 107 (e.g., a checkbox indication or a menu item selection, etc.), which query filter indication is packaged (see operation 130) and sent (see send message $132_1$) to a middleware component.

The middleware component 114 reformats the query filter (see operation 134) and repackages the reformatted query filter (see operation 136) for sending to an application server 116 (see send message $132_2$).

An agent in the backend tier (e.g., in a business application) receives the query filter and builds a dynamically-constructed database query using the query filter (e.g., by parsing the query filter into a WHERE clause, and appending the WHERE clause to a preformed query). The agent prepares to construct a database query to be passed to a database server 122 via a database connectivity technology. For example, the agent may prepare a JDBC SELECT statement (see operation 134).

The application parses the XML-formatted query filter into a format for a JDBC statement (see operation 135). The JDBC statement serves to form a query filter used with a JDBC SELECT statement.

The query filter is appended to a JDBC SELECT statement (see operation 138).

The application executes the dynamically-generated JDBC SELECT statement including the query filter clause (see operation 140).

An agent in the backend tier (e.g., a database server) receives the JDBC SELECT statement and runs the query as a native database query (see operation 142) and returns a result set to the caller (see message 143).

The application performs further processing (see operation 144).

The result set already has the user query filter applied since the query as executed contained the dynamically-created query filter (e.g., a WHERE clause based on the query filter), so the results set is passed to the UI (see operation 146).

Figure 1D:
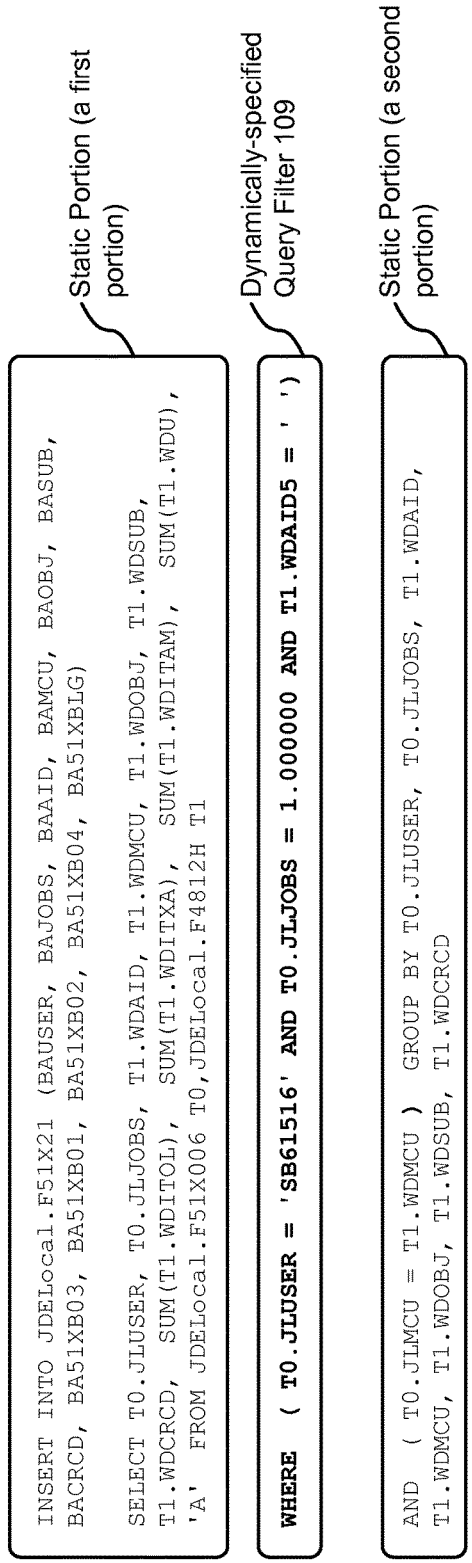
FIG. 1D is an example of a dynamically-generated database language query as used in systems for building a database query by combining a preformed query with a dynamically-specified filter, according to some embodiments.

FIG. 1D is an example of a dynamically-generated database language query 1D00 as used in a system for building a database query by combining a preformed query with a dynamically-specified filter. As an option, one or more instances of dynamically-generated database language query 1D00 or any aspect thereof may be implemented in the context of the architecture and functionality of the embodiments described herein. Also, the dynamically-generated database language query 1D00 or any aspect thereof may be implemented in any desired environment.

The example of FIG. 1B is merely one illustrative example of a dynamically-generated database language query using a user-specified filter. In many situations, the user-specified filter can be formed using a user interface having extensive capabilities. Moreover, the first static portion and the second static portion may be extensive, and may even be pre-generated by a computer process rather than being generated by a human coder. In such a case, the first static portion and the second static portion may comprise computer-generated query terms. Further, in such a case, the user-specified filter may undergo reformatting from a first filter clause representation (e.g., user's selection of values and operands and other filter terms) into a second filter clause representation, and the second filter clause representation may include names and formatting to correspond to the computer-generated predefined static query portions.

As shown, the dynamically-generated database language query 1D00 comprises a first static portion (e.g., a first portion of a preformed query), a dynamically-specified query filter 109, and a second static portion (e.g., a second portion of a preformed query). Such a dynamically-generated database language query can be processed natively in a database server 122.

FIG. 2 depicts a user interface screen 200 as used in systems for building a database query by combining a preformed query with a dynamically-specified filter. As an option, one or more instances of user interface screen 200 or any aspect thereof may be implemented in the context of the architecture and functionality of the embodiments described herein. Also, the user interface screen 200 or any aspect thereof may be implemented in any desired environment.

Referring again to the user interface 112 of FIG. 1A, a user specifies a query filter while using an interactive application. Many techniques are possible for aiding the user in the definition and/or specification of a query filter. For example, an interactive application interface might present one or more interactive screens using screen devices such as option menus, checkboxes, radio buttons, sliders, selection panes, etc.

Using the user interface screen 200, a user can use a term selection pane to select any number of data objects (see data object panel 203), and/or any number of data values (see data value panel 204), and/or any data items (see data item panel 205). Further, a user interface might allow a user to specify (e.g., using interactive screens devices) any number of operations to be included in a multi-term predicate. Operations in a middleware tier and/or backend tier can convert user selections (e.g., selections of operands and operations) into a dynamically-generated database language query by formatting the user-specified filter clause into a predefined database query, which is then acted upon by a backend application.

In some cases, and as shown in user interface screen 200, a screen can include a Boolean or checkbox to indicate the user's intent to specify a query filter. In the example of user interface screen 200, the user has selected "Do Filtering" in the filtering area 202. Such an indication serves to capture a query filter (e.g., a column specification, a data value specification, etc.) from the user which is then transferred from the interactive application to the business logic in a backend tier so that business logic can execute a database query using the end user-provided filter criteria.

Operations during the transfer of the query filter from the interactive application to the backend tier include codification into an intermediate form (e.g., into XML), and the intermediate form may correspond to a schema. A schema can be designed to handle any of a range of aspects of a query filter. One such example is discussed in FIG. 3A.

Figure 3A:
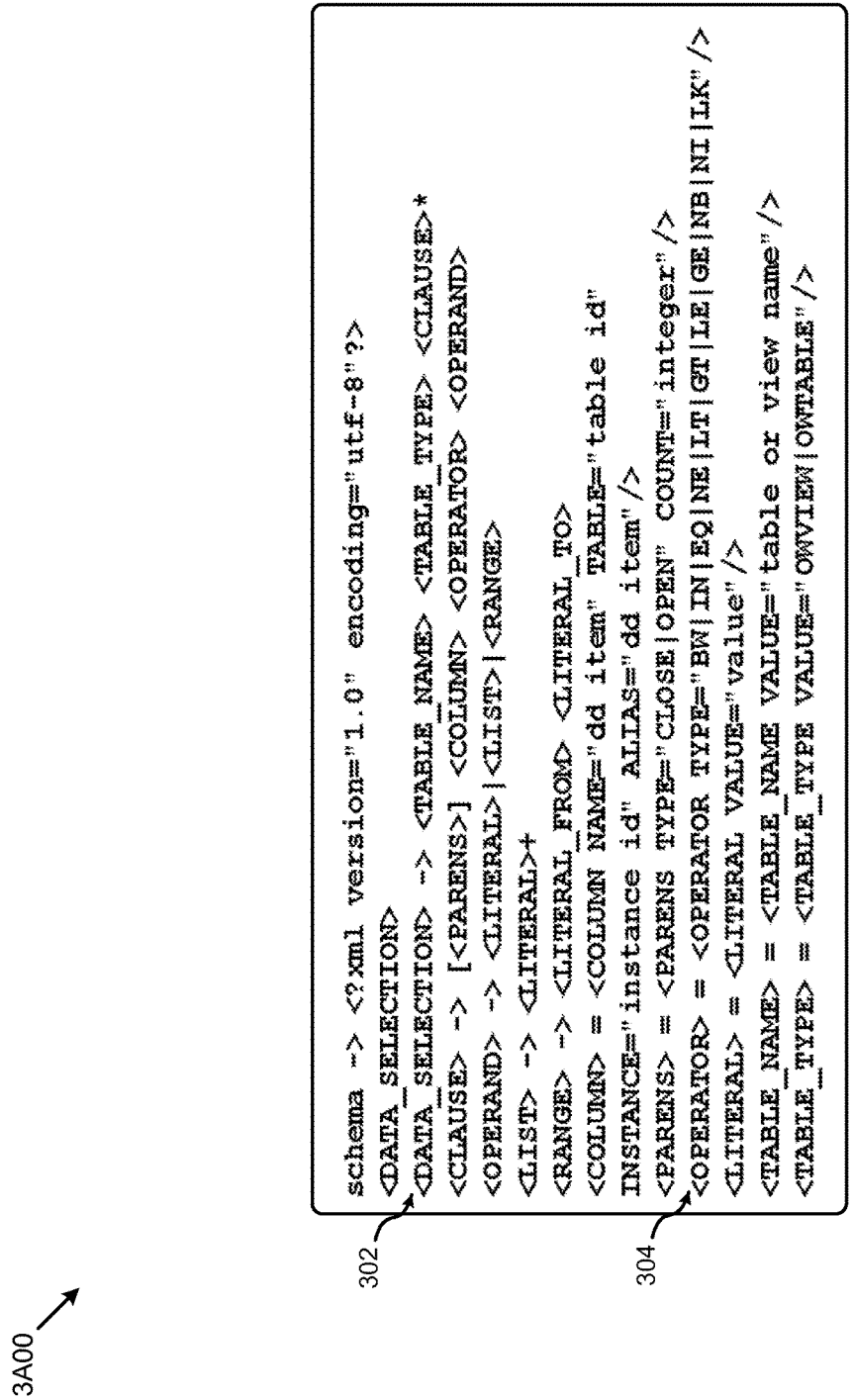
FIG. 3A presents a schema of a dynamically-specified query as used in systems for building a database query by combining a preformed query with a dynamically-specified filter, according to some embodiments.

FIG. 3A presents a schema 3A00 of a dynamically-specified query as used in systems for building a database query by combining a preformed query with a dynamically-specified filter. As an option, one or more instances of schema 3A00 or any aspect thereof may be implemented in the context of the architecture and functionality of the embodiments described herein. Also, the schema 3A00 or any aspect thereof may be implemented in any desired environment.

The shown schema serves to wrap portions of a query filter in XML tags. As shown, a data selection indication (e.g., see data selection tag "<DATA_SELECTION>") can serve to identify and delimit a table name, a table type, and any one or more clauses that can be applied to a named table, and/or serve as a query filter or portion of a query filter.

A data selection tag 302 (e.g., see "<DATA_SELECTION>") can further serve to identify and delimit a table type, and any one or more clauses bounded within a "<DATA_SELECTION>" element.

An operator tag 304 (e.g., see "<OPERATOR>") can serve to identify and delimit operators such as "equal" (e.g., "EQ"), less than (e.g., "LT"), and so on, which operators can then be used in forming a query filter.

As shown, the schema also comprises a CLAUSE tag comprising COLUMN, OPERATOR, and OPERAND tags.

Those skilled in the art will recognize that the schema of FIG. 3A is purely illustrative and variations according to syntax and semantics of a query filter are possible.

Illustrative examples of a query filter in an XML representation, using instances of the aforementioned CLAUSE tag, OPERATOR tag, and OPERAND tags in are given in FIG. 3B.

FIG. 3B is an XML representation of a query filter 3B00 as used in systems for building a database query by combining a preformed query with a dynamically-specified filter. As an option, one or more instances of query filter 3B00 or any aspect thereof may be implemented in the context of the architecture and functionality of the embodiments described herein. Also, the query filter 3B00 or any aspect thereof may be implemented in any desired environment.

As shown in this example, the query filter 3B00 comprises instances of query clauses (e.g., query clause representation $306_1$, query clause representation $306_2$, etc.) given in an XML representation using instances of the aforementioned XML tags. The query filter is subsumed into a data selection clause (e.g., as given in the range between the <DATA_SELECTION> tag $305_1$ and the </DATA_SELECTION> tag $305_2$), which in turn comprises variations of query clauses.

A query clause can comprise elements to describe formatting or syntax (e.g., the "PARENS" clause). Such a query clause that comprises elements to describe formatting or syntax can be used to form a query clause in a SQL syntax.

A query clause can comprise any number of terms (e.g., any number of operators and/or any number of operands). Some operators (e.g., "NOT") are unary operators, some are binary operators that operate over two operands, and some operators are M-nary operators that operate over M operands.

Using an XML representation or any other known representation, an operator can be described as having an operator type (e.g., operator representation 308). And, using an XML representation or any other known representation, an operand can be described as having a literal value and/or a specified range (e.g., see operand representation 309).

Figure 4:
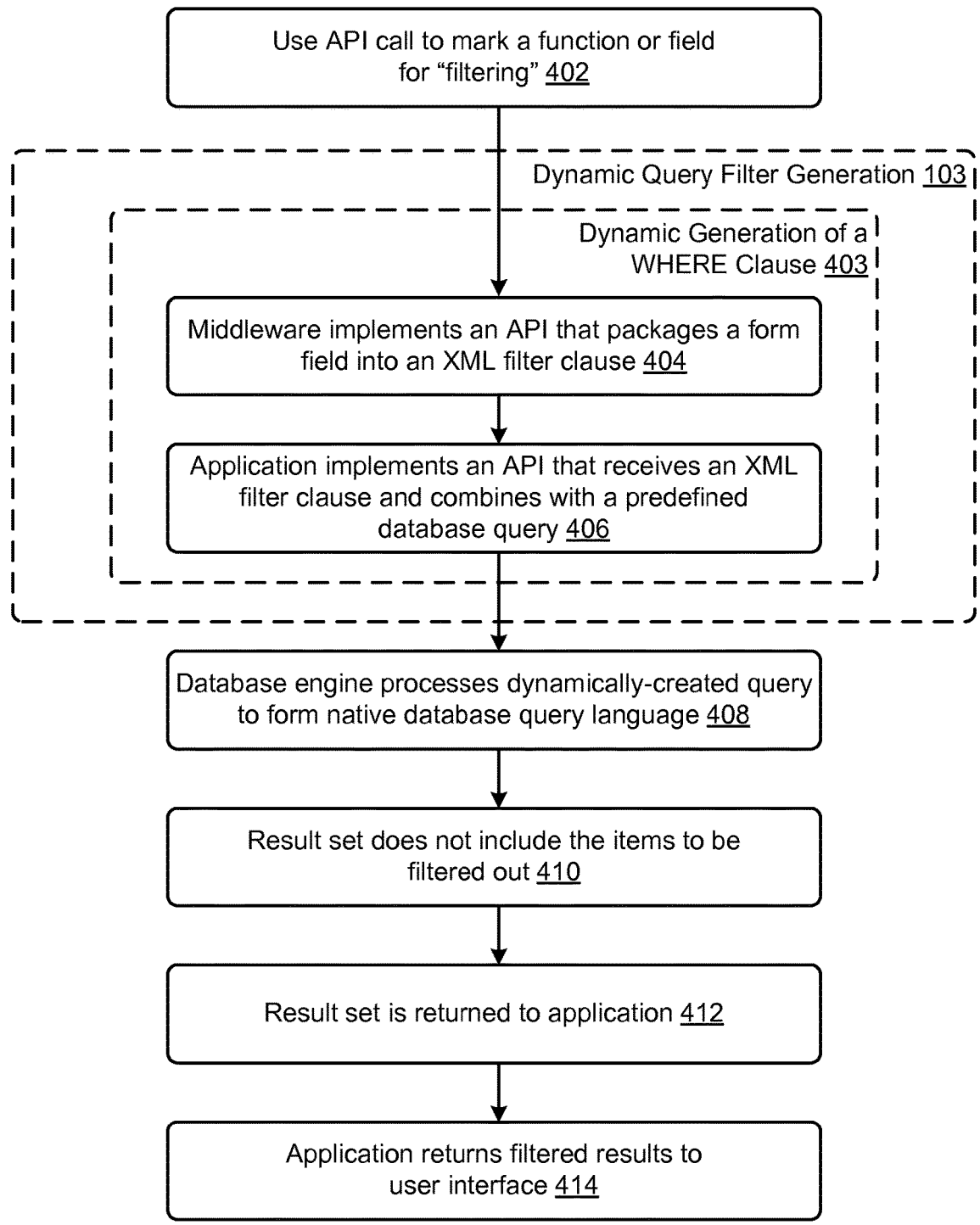
FIG. 4 depicts an operation flow for implementing a system for building a database query by combining a preformed query with a dynamically-specified filter, according to some embodiments.

FIG. 4 depicts an operation flow 400 for implementing a system for building a database query by combining a preformed query with a dynamically-specified filter. As an option, one or more instances of operation flow 400 or any aspect thereof may be implemented in the context of the architecture and functionality of the embodiments described herein. Also, the operation flow 400 or any aspect thereof may be implemented in any desired environment.

As shown, the operation flow 400 commences as a developer marks a function or field to be subject to filtering (see operation 402). In some cases the act of marking a function can be performed using an API (e.g., API 118). Additional calls of the API serve to perform dynamic query filter generation 103. For example, an API call might package a user indication of a query filter into an XML-formatted query filter 106. A further call to the API might form a JDBC-formatted query 108.

The embodiment of FIG. 4 performs dynamic generation of a WHERE clause 403 using a combination of a middleware component 114 (e.g., comprising a parser and/or a mapper) and an application 117. More specifically, a middleware component that implements the aforementioned API serves to package a form field into an XML filter clause (see operation 404). Then an application receives the XML filter clause and re-formats the XML filter clause to be appended to a database query (see operation 406).

When a database engine (e.g., see database server 122) receives the dynamically-created query, it processes the query (see operation 408). Since the database query includes the user's filter query, the result set would be void of results that were filtered out by the query filter (see operation 410). This result set is returned to the application (see operation 412), and the application processes the returned result set (see operation 414), possibly presenting the filtered result set to the requesting user.

Additional Embodiments of the Disclosure

Additional Practical Application Examples

Figure 5:
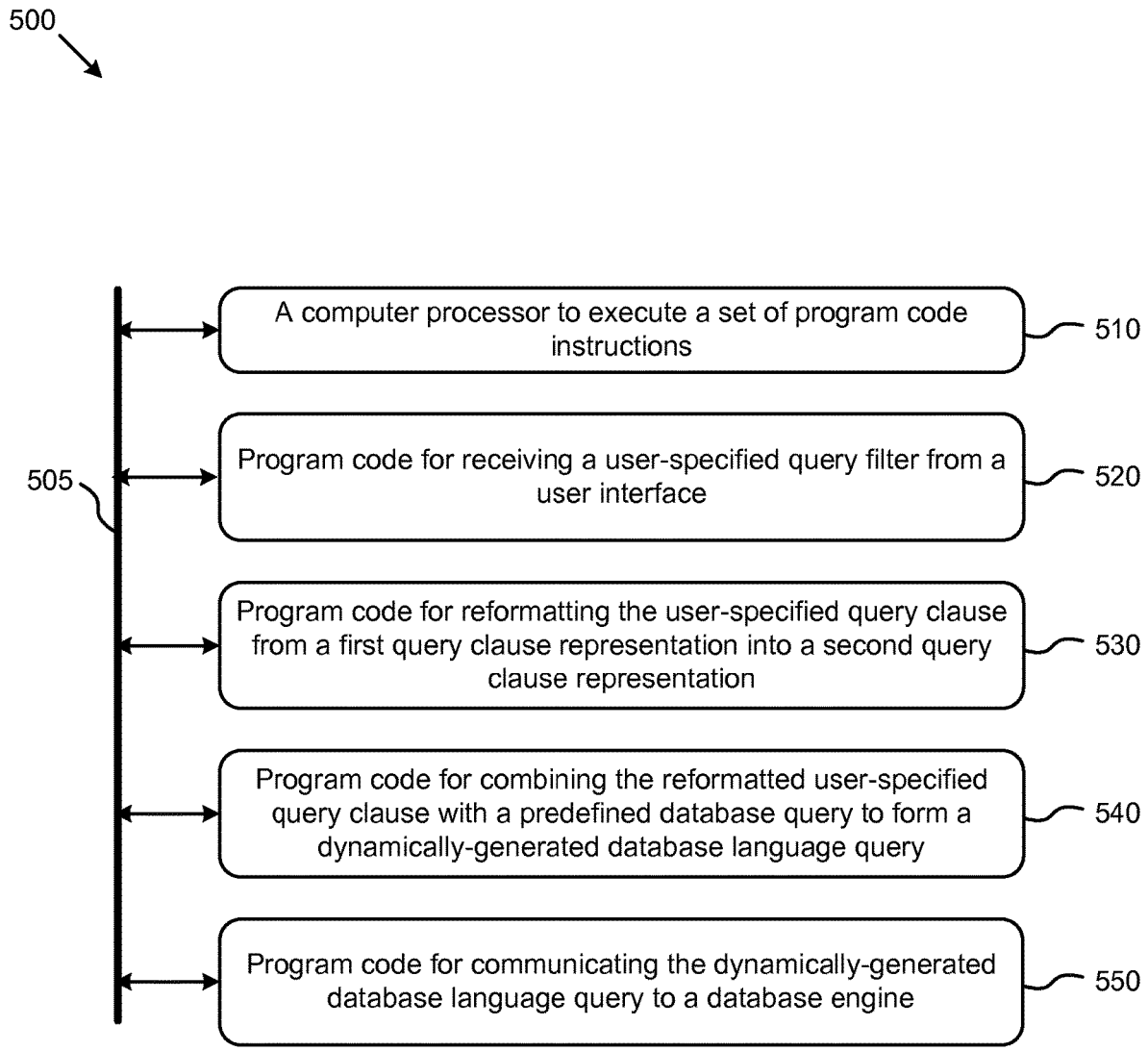
FIG. 5 is a block diagram of a system for building a database query by combining a preformed query with a dynamically-specified filter, according to some embodiments.

FIG. 5 is a block diagram of a system for building a database query by combining a preformed query with a dynamically-specified filter, according to some embodiments. FIG. 5 depicts a block diagram of a system to perform certain functions of a computer system. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: receiving a user-specified query filter from a user interface (see module 520); reformatting the user-specified interface from a first query clause representation into a second query clause representation (see module 530); and combining the reformatted user-specified filter with a predefined database query to form a dynamically-generated database language query (see module 540). The method further comprises communicating the dynamically-generated database language query to a database engine (see operation 550).

Figure 6:
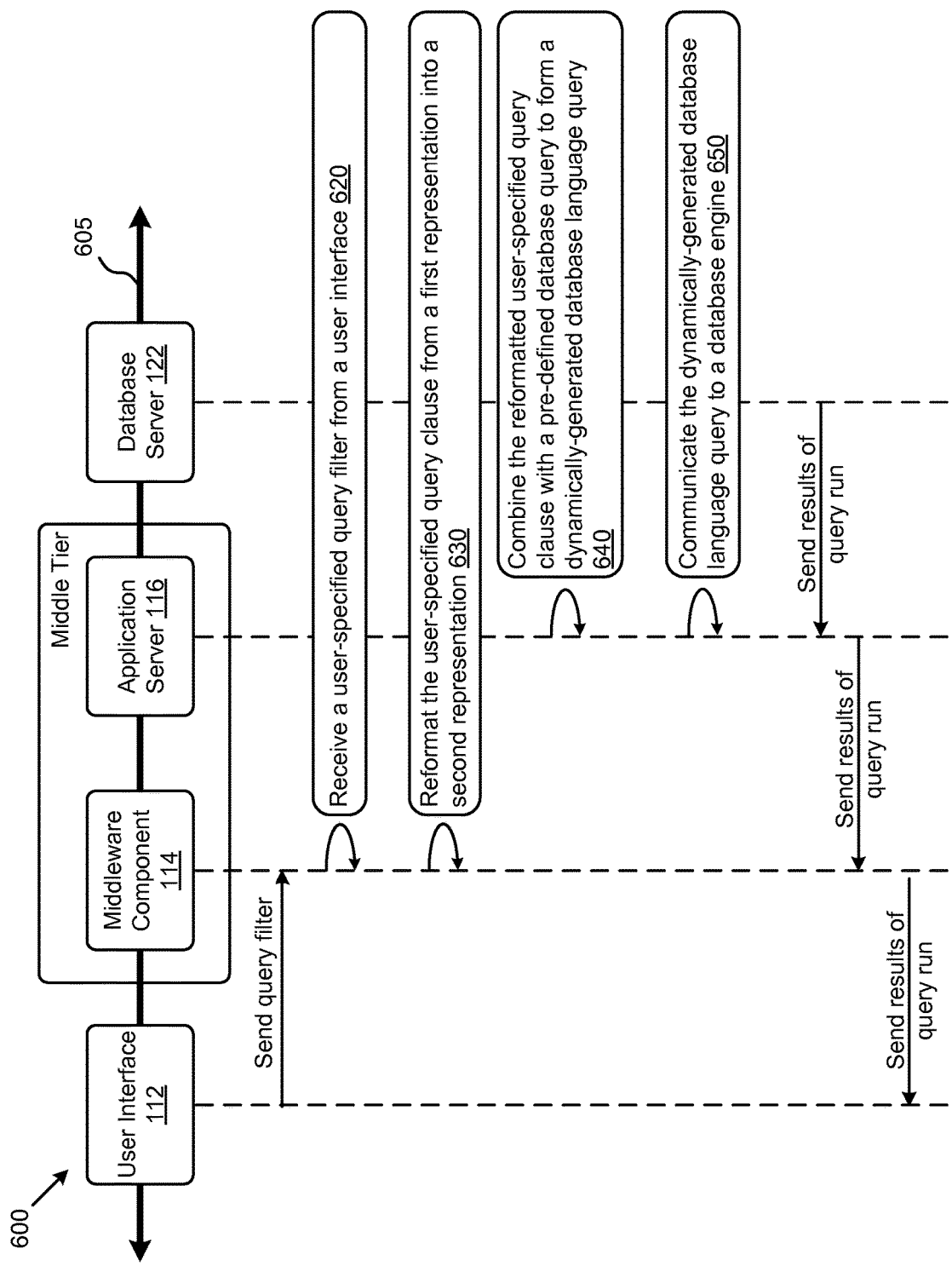
FIG. 6 is a block diagram of a system for building a database query by combining a preformed query with a dynamically-specified filter, according to some embodiments.

FIG. 6 is a block diagram of a system for building a database query by combining a preformed query with a dynamically-specified filter. As shown, modules are connected to a communication path 605, and any modules can communicate with other modules over communication path 605. The modules of the system can, individually or in combination, perform method operations within system 600. Any operations performed within system 600 may be performed in any order unless as may be specified in the claims.

The embodiment of FIG. 6 depicts a middle tier including a middleware component 114 configured to receive instances of user query filters (e.g., a user-specified query filter indication 107) from a user interface (see module 620). The user-specified query filter indication 107 is formulated by using one or more interactive screen devices (e.g., menus, checkboxes, radio buttons, etc.) from within a user interface running in a client tier. In this embodiment, the interactive screen devices do not permit the user to input native SQL statements or any other database query language statements.

As shown, the middleware component serves to reformat the user-specified interface from a first representation (e.g., menu selections, checkboxes, radio button selections, etc.) into a second representation (see module 630); and combining the reformatted user-specified filter with a predefined database query to form a dynamically-generated database language query (see module 640). The embodiment further comprises communicating (e.g., via an application server over a database connectivity path) the dynamically-generated database language query to a database engine (see operation 650).

Figure 7:
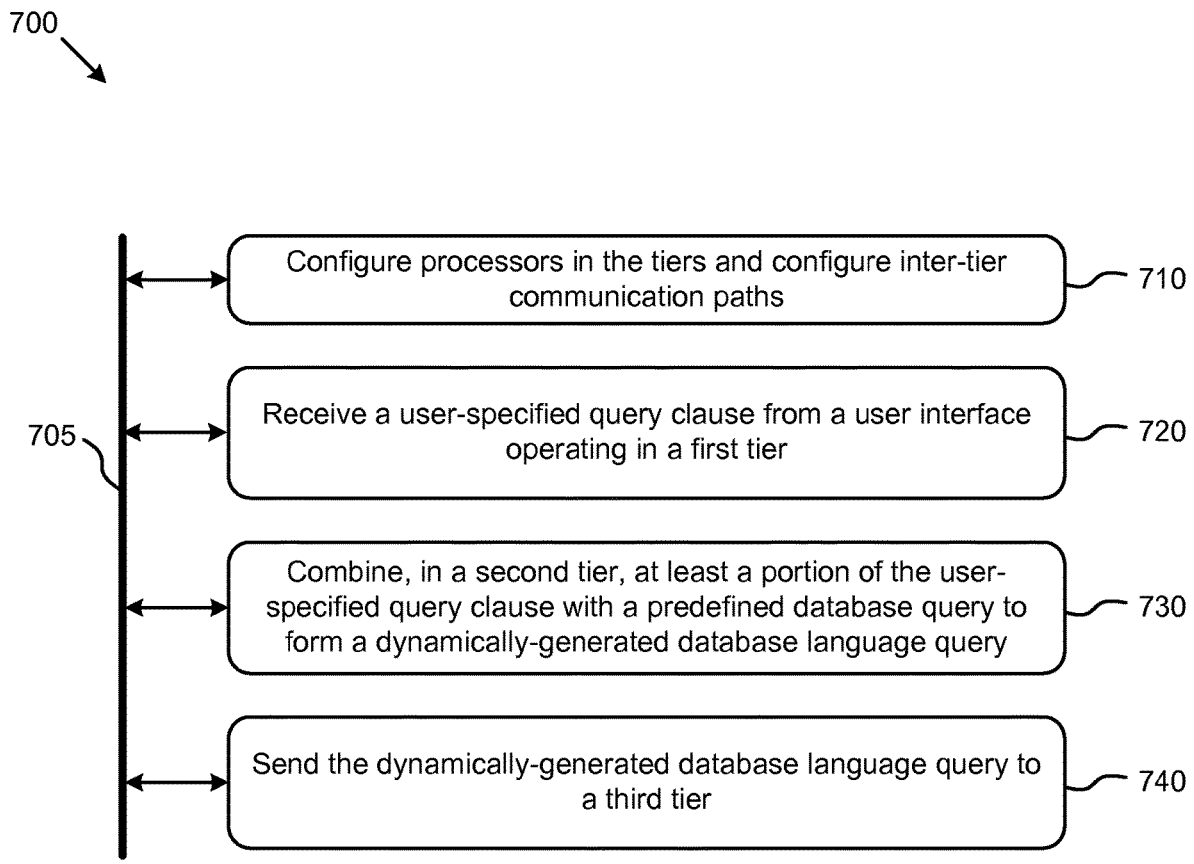
FIG. 7 is a block diagram of a multi-tier system for building a database query by combining a preformed query with a dynamically-specified filter, according to some embodiments.

FIG. 7 depicts a block diagram 700 of a multi-tier system to perform certain functions of a computer system. The computer system comprises a plurality of processors organized into three or more tiers. Processors within the tiers are connected to each other over communication path 705, and the processors are configured (see module 710) to perform one or more steps comprising: receiving a user-specified query clause from a user interface operating in a first tier (see module 720); combining, in a second tier, at least a portion of the user-specified query clause with a predefined database query to form a dynamically-generated database language query (see module 730); and sending the dynamically-generated database language query to a third tier (see module 740).

Figure 8:
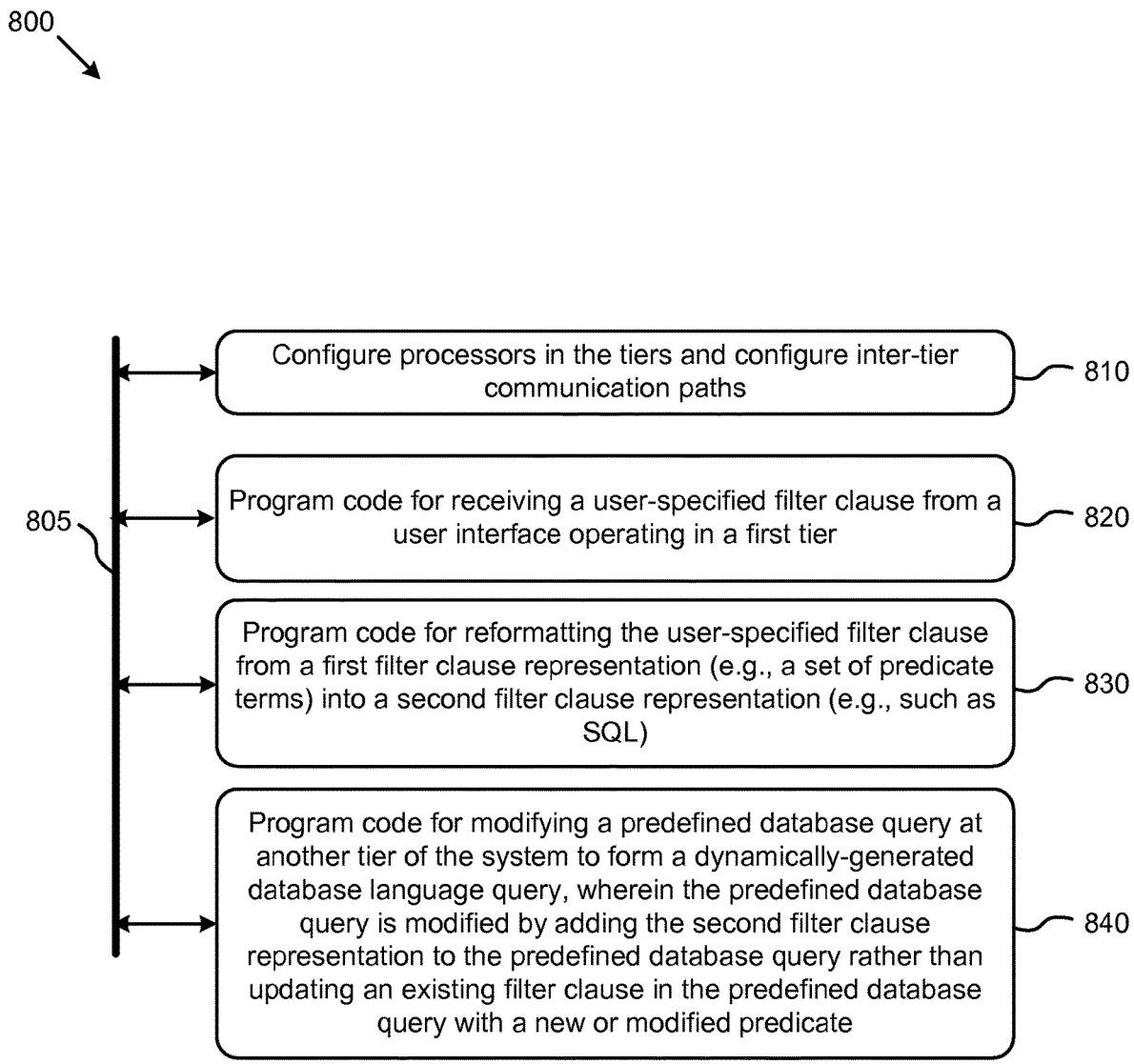
FIG. 8 is a block diagram of a multi-tier computer system for building a database query by combining a preformed query with a dynamically specified filter, according to some embodiments.

FIG. 8 depicts a block diagram 800 of a multi-tier system for building a database query by combining a preformed query with a dynamically-specified filter.

As shown, system 800 comprises at least one processor and at least one memory, the memory serving to store program instructions corresponding to the operations of the system. An operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The embodiment of FIG. 8 implements a computer system, shown as system 800, comprising a plurality of computer processors to execute a set of program code instructions. Such processors are arranged into tiers, and communication paths between the tiers are configured (see module 810). The processors access modules including memory to hold program code instructions to perform: receiving a user-specified filter clause from a user interface operating in a first tier (see module 820); reformatting the user-specified filter clause from a first filter clause representation (e.g., predicate terms) into a second filter clause representation such as SQL (see module 830); and modifying a predefined database query at another tier of the system to form a dynamically-generated database language query, wherein the predefined database query is modified by adding the second filter clause representation to the predefined database query rather than updating an existing filter clause in the predefined database query with a new or modified predicate (see module 840).

System Architecture Overview

Additional System Architecture Examples

Figure 9:
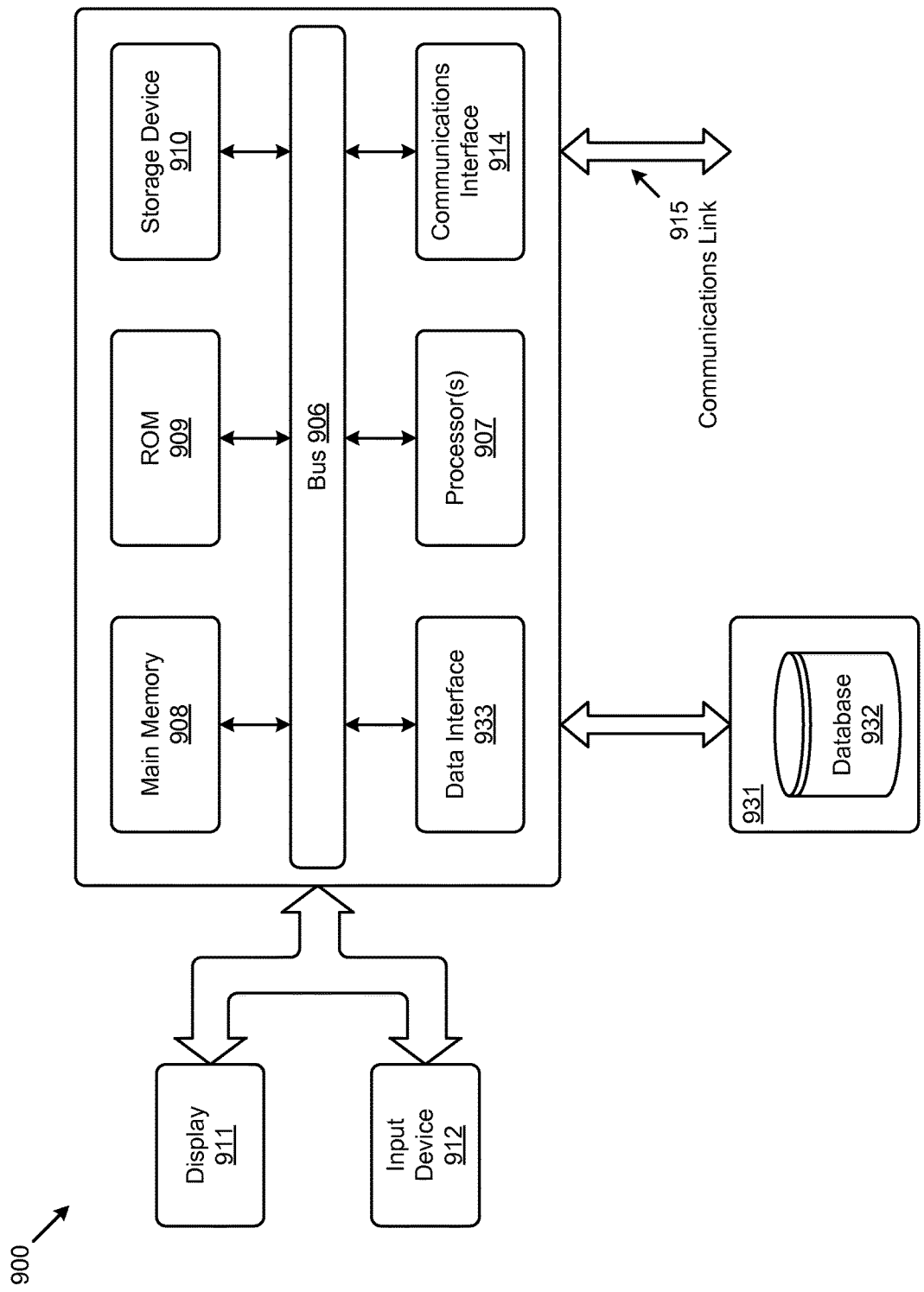
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method using a system organized to have three or more tiers comprising one or more processors, the one or more processors performing one or more steps comprising:
    identifying a predefined database query, the predefined database query comprising one or more static query clauses;
    receiving a user-specified filter clause from a user interface operating in a first tier;
    reformatting the user-specified filter clause from a first filter clause representation into a second filter clause representation; and
    modifying the predefined database query at a second tier of the system to form a dynamically-generated database language query, the predefined database query being modified by combining the second filter clause representation to the predefined database query rather than updating an existing filter clause in the predefined database query with a new or modified predicate, the dynamically-generated database language query comprising both the second filter clause representation and the one or more static query clauses, the second filter clause representation being added to the one or more static query clauses that remain static in the predefined database query rather than the one or more static query clauses being updated when modifying the predefined database query.

2. The method of claim 1, wherein the user-specified filter clause is specified using an interactive screen device and the predefined database query comprises SQL.

3. The method of claim 2, wherein the second filter clause representation comprises a SQL WHERE clause.

4. The method of claim 1, wherein the reformatting is performed by a middleware component.

5. The method of claim 4, wherein the predefined database query is registered with the middleware component.

6. The method of claim 1, wherein the predefined database query is a static query specified by an application.

7. The method of claim 6, wherein the application runs in a middleware tier or backend tier.

8. The method of claim 1, wherein the user-specified filter clause comprises two or more data selection terms.

9. The method of claim 8, wherein the two or more data selection terms comprise at least one value and least one operator.

10. The method of claim 1, the processor to perform one or more steps further comprising:
    selecting at least one of a data object, a data value or a data item on a term selection pane within a user interface screen, wherein the user interface comprises: (1) a term selection pane to select at least a data object, a data value or a data, and (2) a Boolean or checkbox to indicate an intent to specify a query filter;
    marking a function or field to be subject to filtering, wherein marking the function or field is performed using an API;
    receiving, at a database engine, a dynamically created query from the user interface screen;
    returning a result set to an application; and
    processing, at the application, the returned result set,
    wherein the dynamically-generated database language query comprises an XML-formatted query filter and a JDBC-formatted query.

11. A computer program product embodied in a non-transitory computer readable medium, the computer readable medium having stored thereon a sequence of instructions which, when executed by a processor causes the processor to execute a process, the process comprising:
 identifying a predefined database language query, the predefined database query comprising one or more static query clauses corresponding to unchanged portions of the predefined database query;
 receiving a user-specified filter clause from a user interface operating in a first tier;
 reformatting the user-specified filter clause from a first filter clause representation into a second filter clause representation; and
 modifying the predefined database query at a second tier of the system to form a dynamically-generated database language query, the predefined database query being modified by combining the second filter clause representation to the predefined database query rather than updating an existing filter clause in the predefined database query with a new or modified predicate, the dynamically-generated database language query comprising both the second filter clause representation and the one or more static query clauses, the second filter clause representation being added to the one or more static query clauses that remain static in the predefined database query rather than the one or more static query clauses being updated when modifying the predefined database query.

12. The computer program product of claim 11, wherein the user-specified filter clause is specified using an interactive screen device and the predefined database query comprises SQL.

13. The computer program product of claim 12, wherein the second filter clause representation comprises a SQL WHERE clause.

14. The computer program product of claim 11, wherein the reformatting is performed by a middleware component.

15. The computer program product of claim 14, wherein the predefined database query is registered with the middleware component.

16. The computer program product of claim 11, wherein the predefined database query is a static query specified by an application.

17. The computer program product of claim 16, wherein the application runs in a second tier or runs in a third tier.

18. A computer system comprising:
 a first tier processor to receive a user-specified filter clause from a user interface operating in the first tier; and
 a second tier processor configured to:
  identify a predefined database query, the predefined database query comprising one or more static query clauses corresponding to unchanged portions of the predefined database query;
  reformat the user-specified filter clause from a first filter clause representation into a second filter clause representation; and
  modify the predefined database query at a second tier of the system to form a dynamically-generated database language query, the predefined database query being modified by combining the second filter clause representation to the predefined database query rather than updating an existing filter clause in the predefined database query with a new or modified predicate, the dynamically-generated database language query comprising both the second filter clause representation and the one or more static query clauses, the second filter clause representation being added to the one or more static query clauses that remain static in the predefined database query rather than the one or more static query clauses being updated when modifying the predefined database query.

19. The computer system of claim 18, wherein the user-specified filter clause is specified using an interactive screen device and the predefined database query comprises SQL.

20. The computer system of claim 18, wherein the second filter clause representation comprises a SQL WHERE clause.

* * * * *

UNITED STATES PATENT AND TRADEMARK OFFICE
CERTIFICATE OF CORRECTION

| | | |
|---|---|---|
| PATENT NO. | : 10,803,054 B2 | Page 1 of 1 |
| APPLICATION NO. | : 14/171474 | |
| DATED | : October 13, 2020 | |
| INVENTOR(S) | : Pandey | |

It is certified that error appears in the above-identified patent and that said Letters Patent is hereby corrected as shown below:

On the Title Page

On page 2, Column 1, under Other Publications, Line 13, delete "Muti-Tier" and insert -- Multi-Tier --, therefor.

In the Specification

In Column 6, Line 47, delete "QXDA" and insert -- XDA --, therefor.

In Column 7, Line 28, delete ".COUINTRY" and insert -- .COUNTRY --, therefor.

In Column 13, Line 44, delete "PTSN," and insert -- PSTN, --, therefor.

In the Claims

In Column 14, Line 48, in Claim 9, delete "least" and insert -- at least --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*